June 16, 1931.  C. W. VOGT  1,810,863
APPARATUS FOR CONTINUOUSLY HARDENING PLASTIC MATERIALS
Filed April 23, 1930  2 Sheets-Sheet 1
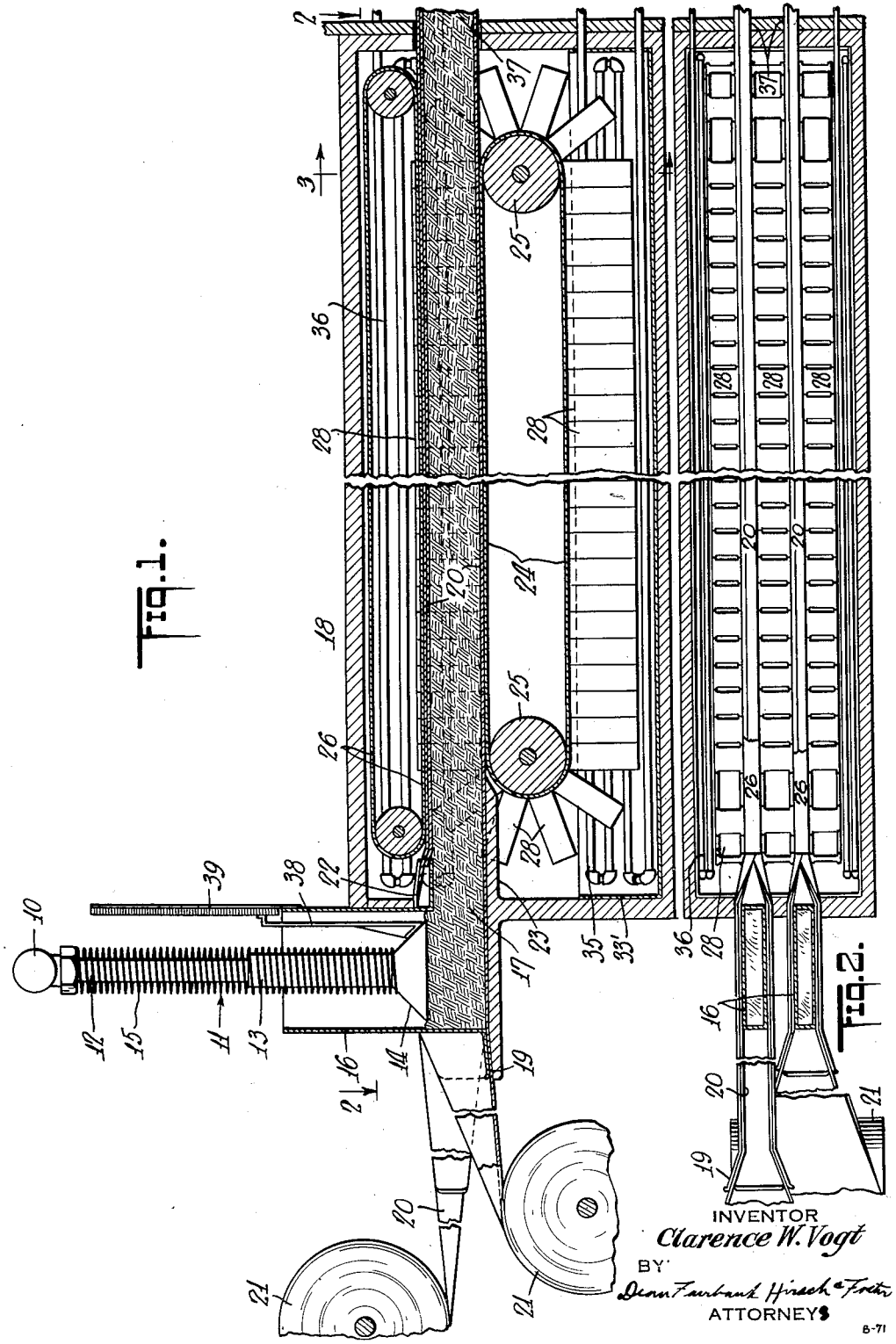
INVENTOR
*Clarence W. Vogt*
BY
ATTORNEYS June 16, 1931.   C. W. VOGT   1,810,863
APPARATUS FOR CONTINUOUSLY HARDENING PLASTIC MATERIALS
Filed April 23, 1930   2 Sheets-Sheet 2

INVENTOR
Clarence W. Vogt
BY
Dean Fairbank Hirsch & Foster
ATTORNEYS

Patented June 16, 1931

1,810,863

UNITED STATES PATENT OFFICE

CLARENCE W. VOGT, OF LOUISVILLE, KENTUCKY, ASSIGNOR TO VOGT INSTANT FREEZERS INCORPORATED, OF LOUISVILLE, KENTUCKY, A CORPORATION OF DELAWARE

APPARATUS FOR CONTINUOUSLY HARDENING PLASTIC MATERIALS

Application filed April 23, 1930. Serial No. 446,474.

The present invention relates to refrigerating systems for freezing plastic material into solid or form sustaining condition and is particularly adaptable to the manufacture of ice cream or other comestibles wherein the mix or other material in a partially frozen or otherwise substantially soft or plastic condition is subjected to a final hardening process.

The present invention accordingly provides new and improved means whereby the transition of ice cream or other comestibles from a soft or semi-frozen state into a form sustaining consistency is expeditiously effected.

In my prior copending application Serial No. 402,339, filed October 25, 1929, I have disclosed and broadly claimed another means for accomplishing the same general result, the present invention being one embodiment of such means. The process employed in the apparatus of the present application is disclosed and claimed in my copending application Serial No. 507,629, filed January 9, 1931.

As one important feature of my invention, I provide a conveyor carrying heat absorbing surfaces which are arranged to form a trough for the reception therein of the material whose temperature is to be lowered. These surfaces constitute the sides of the trough and are preferably positioned in parallel relationship to form a substantially U-shaped trough in conjunction with their associated conveyor, although they may also be inclined, if desired, to converge upwardly into V-shape relationship.

In order that the material may be rapidly and effectively refrigerated, the U-shaped trough is preferably a comparatively narrow and deep one so that the side walls constituting the heat absorbing surfaces are of very much greater area than the bottom or supporting wall. Thus all portions of the material are at the minimum distance from the heat absorbing surfaces.

As another important feature of the invention, the sides of the trough are made sectional so that they may conjointly form continuous side walls for the conveyor, said walls passing around supporting pulleys.

These side walls are so formed as to have the maximum heat absorbing capacity and are preferably made of receptacles adapted to contain a refrigerant which may be frozen during the return run of the conveyor and thus act on the material during the conveying run both by reason of the low temperature of these walls and by reason of the latent heat of the melting of the material in the receptacles forming the walls.

As another important feature, the heat absorbing elements are carried on a supporting conveyor and as side walls of the trough so that these walls travel in preferably spaced vertical planes and may pass to a lower level on the return. This arrangement permits the heat absorbing elements to be dipped into a suitable refrigerant tank on their return and become thermally reactivated. It should be noted that this advantage could not be obtained if the heat absorbing elements were mounted on separate side conveyors movable continuously in the same horizontal plane. By reactivating the heat absorbing elements by direct contact with a liquid refrigerant the rate of heat transfer is far greater than if they be reactivated by cold air, due to the fact that liquid in contact with the walls of the element has a greater specific heat and a higher rate of heat transfer than has gas.

Thus the hardening chamber may be made shorter or the rate of travel of the material to be solidified may be operated faster.

As the refrigerating elements are capable of absorbing heat from each of their opposite sides there may be simultaneously handled two or more bars of the material to be solidified so that the capacity of the apparatus may be greatly increased with the minimum increase in the number of operating parts.

In my improved construction, even though only a single bar is to be refrigerated, the passageway for the material is formed of and defined by only two conveyors and associated heat absorbing elements, and the material is supported from the top, bottom and both sides. Thus there is a very important saving in the number of operating parts over what is required where four separate conveyors are employed to define the four sides of the passageway as has been previously proposed.

The invention also involves various new and useful features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description, taken in connection with the accompanying drawings forming a part thereof, in which Fig. 1 is a vertical longitudinal section through the apparatus.

Fig. 2 is a horizontal longitudinal section taken on line 2—2 of Fig. 1.

Like reference characters denote like parts in the several figures of the drawings.

Figure 3:
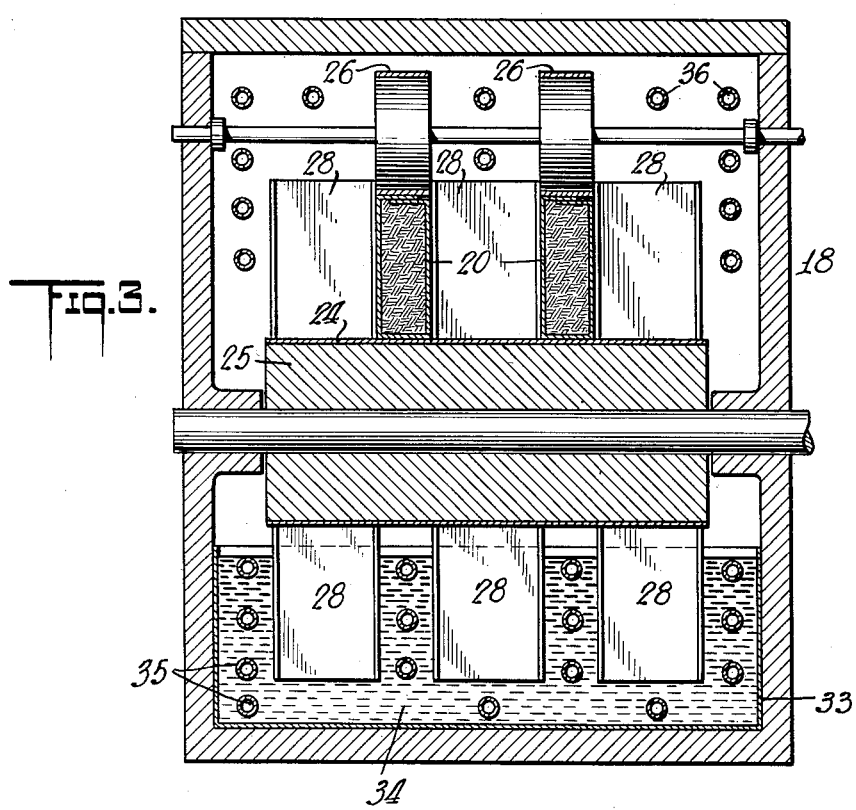
Fig. 3 is a vertical transverse section taken on line 3—3 of Fig. 1.
Figure 4:
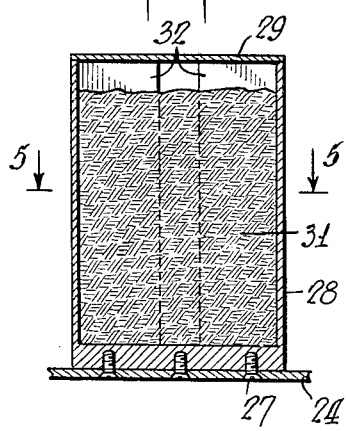
Fig. 4 is a section through one of the refrigerant receptacles, said section being taken on line 4—4 of Fig. 5.
Figure 5:
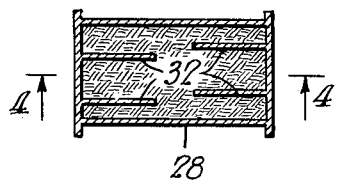
Fig. 5 is a section taken on line 5—5 of Fig. 4.

In the following description and in the claims, parts will be identified by specific names for convenience, but they are intended to be as generic in their application to similar parts as the art will permit.

So far as my present invention is concerned, it is immaterial what apparatus be employed for preliminarily treating the material to bring it to semi-plastic form, if such apparatus be necessary in view of the character of the material. The semi-plastic material is preferably enclosed in a rectangular tube of thin waterproof paper or the like, but so far as my present invention is concerned, it is immaterial how the tube is formed and what means is employed for causing the material to fill the tube. Merely as an example, I have illustrated an apparatus in which a strip of paper is folded to U-shaped form, the material deposited therein, and the edges of the paper folded over to form the tube prior to the entrance of the tube and bar of material into the refrigerating chamber. This mechanism may be substantially the same as that illustrated in my prior and copending application Serial No. 402,339, filed October 25, 1929.

It should be noted that the use of a protective web for the material to be treated is not an indispensable factor. The use of such protective webs may be eliminated in cases, for instance, where the cohesive properties of the material to be treated is sufficiently greater than its adhesive property to obviate the adhesion of the side of the material to the elements of the conveying system. In that case it is obvious that the use of such protective web for the purpose of preventing the material from sticking to the sides of the conveyor element would not be necessary inasmuch as the material could be dislodged very easily from its engagement with these conveyor elements. The wrapper is particularly desirable where the material is a food product and sanitation is important.

The cream is first partially frozen, agitated and aerated to form a semi-plastic mass by means of a suitable apparatus such as one or more continuous or batch freezers. Merely as an example, the material may be delivered from such an apparatus as is shown in my prior Patents 1,783,864, 1,783,866 or 1,783,867, issued Dec. 2, 1930. In the apparatus illustrated, it is then fed through a main conduit 10 having depending therefrom a delivery conduit 11, comprising a tubular element 12 having telescopically mounted with respect thereto a tubular element 13, the bottom of which terminates in a flared head 14. Disposed between this flared head 14 and the main conduit 10 is a contractile spring 15 which serves to urge the tubular element 13 into telescopic relationship with the element 12. The effect of this spring, however, is counteracted by the weight of the lower element 13, and the dragging force of the material passing through said element.

The mechanism illustrated is described more fully and claimed in copending application Serial No. 402,362, filed Oct. 25, 1929.

The bottom portion of the delivery conduit 11 is disposed in a corresponding receptacle 16, into which the partially frozen ice cream is forced. This receptacle 16 is constructed with a cross section slightly larger than the configuration of the element 13 and flared head 14 in order to permit the free vertical movement of said element and head therein.

The receptacle 16 is provided with an outlet 17 which leads into a hardening chamber 18 and has disposed on both sides and bottom thereof guide elements 19, the sides of which are flared at one end to receive a web 20 as a continuous sheet from a suitable source, as for instance, a reel 21. The web 20, which may be scored or creased to facilitate the bending thereof, is delivered between the guide elements 19 and the sides of the receptacles 16 in a channel shape until it approaches the outlet 17. There another paper guide 22 is provided which is adapted to fold the top portions of the web 20 into over-lapping relationship. It is important to have the reel 21 spaced from the guide element 19 a sufficient distance to effect efficient progressive bending of the web 20 into channel shape without undue stressing.

As the soft ice cream is extruded from the outlet 17 of the receptacle 16 and is wrapped by the protective web 20, it is advanced into the field of action of the hardening chamber 18 where it is frozen into a form sustaining configuration. In passing into the hardening chamber 18, the ice cream is supported on a plate 23 integrally extending from one side wall of the hardening chamber 18. This plate 23 terminates adjacent an endless conveyor 24 mounted in suitable journal pulleys or sprockets 25. Through the instrumentality of this arrangement, the sheathed ice cream is delivered from the plate 23 on to the conveyor 24 and advanced towards the other end of the chamber 18.

Disposed along the top of the chamber 18 is an endless conveyor 26 having the bottom run thereof in opposition to the top of the encased ice cream bar. The conveyor is preferably in the form of a metal belt so as to provide a suitable medium for transferring the heat away from the upper portion of said ice cream bar. It should be noted that the conveyor 26 determines the ultimate height of the ice cream bar and also serves to continuously advance the bar through the chamber 18.

In carrying out my present invention, the bottom conveyor 24 has secured thereto by any suitable means such as screws 27, a plurality of heat transferring elements which are preferably mounted in parallel relationship to form a U-shaped trough and which may take the form of refrigerating storage receptacles 28. Each receptacle is provided with a closure plate 29 so that a refrigerant such as ice and salt or brine 31 can be retained therein. Integrally extending from the side walls of said receptacles 28 are a plurality of fins 32 which project into the refrigerant containing space. The advantage of the fins rests in the fact that when the receptacles are passing through the brine tank, these fins will permit the heat in the receptacles to be more rapidly dissipated into the refrigerant in the brine tank and therefore a more complete or rapid congealing of the material will take place. This will permit of a relatively higher temperature refrigerant in the brine tank than would otherwise be satisfactory.

Disposed at the bottom of the chamber 18 is a tank 33 containing a suitable liquid refrigerant agent 34, such as brine, and having serpentined therein the expansion coils 35 of a suitable refrigerating system. Disposed towards the top of the chamber 18 is another series of expansion coils or cold brine coils 36 adapted to cool the air surrounding the upper portion of said chamber.

In the operation of the machine the receptacles 28 pass around the righthand pulley 25 (Fig. 1) in a clockwise direction and are successively immersed in the refrigerant 34 where they are chilled and the refrigerant therein wholly or partially solidified. After circulating the entire length of the tank 33, these receptacles 28 pass around the lefthand pulley 25 (Fig. 1) into heat transferring relationship with the semi-frozen ice cream. During the maintenance of this relationship, the heat from the sides of the ice cream bar is transmitted through the side walls of the receptacles 28 and into the refrigerant 31, to utilize not only the low temperature of the latter but also the latent heat of melting thereof. The conveyor 24 is preferably constructed of metal so as to provide a means for transferring the heat away from the bottom edges of the ice cream bar and may be constructed of interlinked elements.

It should be noted that these receptacles 28 are mounted in adjacent relationship on the conveyor 24 so that the side walls thereof conjointly present a continuous surface to the wrapped ice cream bar. It should also be noted that the coils 36 serve to cool the air surrounding the upper portion of the chamber 18 so that the heat transferring capacities of these receptacles 28 are not dissipated too rapidly. It may be desirable in some cases to equip the chamber 18 with sufficient amount of the coils 36 in order to maintain the atmosphere at a temperature as low or even lower than the temperature of the receptacles 28 so that the atmosphere in the chamber would serve to cool these receptacles while the latter are passing through their heat absorbing phase of the cycle. It should further be noted that these receptacles 28 are not entirely filled with refrigerant 31 so that a free expansion and contraction of said refrigerant is permitted during successive cyclic heat changes.

The conveyors 24 and 26 conjointly with receptacles 28 define the ultimate sustaining configuration of the ice cream bar and all of these elements not only contribute towards the cooling of the ice cream into a hardening consistency, but also serve to advance said bars towards the exit end of the chamber 18 which is provided for that purpose with an opening 37.

The apparatus as illustrated is adapted to treat a plurality of bars at the same time. There are shown a plurality of the upper conveyors 26 while the lower conveyor 24 has separate spaced rows of the receptacles so that each of the receptacles of the intermediate rows serve to extract heat from and solidify two separate bars on opposite sides thereof. There are as many feeding mechanisms as there are grooves or channels in the lower conveyor. Where a plurality of bars are to be covered by separate strips or webs of paper, the reels for supplying the paper should be relatively spaced to obviate their possible interference with the bending of their respective webs.

In order to insure the synchronous feeding of the ice cream through the conduit 11, with the operation of the conveyors 24 and 26, one of the flared heads 14 has secured thereto one end of a conducting element 38, the other end of which slidably co-operates with a suitable rheostat arrangement 39. This rheostat 39 is adapted to control the amount of current supplied to a motor (not shown) which operates the conveyors 24 and 26. This arrangement does not form part of the present invention, and details thereof have been eliminated for the sake of simplicity.

In case the feed of ice cream through the conduit 11 is greater than the rate with which the conveyors 24 and 26 carry it away, the ice cream will pile up and cause the tubular elements 13 to be elevated. This operation will cause the conducting element 38 to correspondingly rise into position to increas the current input into the motor so that the ice cream can be conveyed from the receptacles 16 at a greater rate. If the material is delivered to the receptacles 16 at a faster rate than it can be conveyed therefrom, the opposite effect is produced.

After the hardened ice cream has passed outside the hardening chamber, it may be deposited on a conveyor (not shown) and advanced into the field of action of a suitable device for cutting the ice cream bar into successive lengths.

It should be noted that by providing a refrigerating liquid as a cooling medium for receptacles 28, a more expeditious chilling of said receptacles is effected than is the case where they are chilled by an air current. It should also be noted that through the instrumentality of only two conveying systems, the present invention has provided a simplified means of simultaneously treating more than one ice cream bar.

It should be further noted that by means of the present arrangement it is possible to use a refrigerant tank for reactivating the heat absorbing element. This particular feature is effected by mounting the conveyor 24 so that the heat absorbing elements thereon travel along substantially vertical planes or along a plane which will permit the elements to dip in a suitable refrigerant tank.

The present invention has been described with particular adaption to the manufacture of ice cream, but it is obvious that it can be employed in the freezing of any plastic material into form sustaining configurations, or in the lowering of the temperature of any substance such as lard, oleomargarine, eggs and the like, without departing from the spirit of the invention.

While certain novel features of the invention have been shown and described and are pointed out in the annexed claims, it will be understood that various omissions, substitutions and changes in the forms and details of the device illustrated and in its operation may be made by those skilled in the art, without departing from the spirit of the invention.

I claim:

1. An apparatus for reducing the temperture of a substance comprising a heat conducting element containing a congealable liquid, a container for a body of liquid refrigerant, means for immersing said element into said refrigerant and for advancing said element into heat transferring relationship with said substance.

2. An apparatus for hardening plastic material into a form retaining consistency comprising a heat conducting element containing a congealable liquid, a container for a body of liquid refrigerant, means for immersing said element into said refrigerant and means for advancing said element into heat transferring relationship with said plastic material.

3. An apparatus for hardening plastic material into a form retaining consistency comprising a plurality of heat conducting elements, a container for a body of liquid refrigerant, means for successively immersing said elements into said body of refrigerant and means for advancing said elements into heat transferring relationship with said plastic material.

4. An apparatus for hardening plastic material into a form retaining consistency comprising a heat conducting element containing a liquid at least partially congealed, a container for a body of liquid refrigerant, means for cyclically immersing said element into said refrigerant and subsequently advancing it into heat transferring relationship with said plastic material.

5. An apparatus for hardening plastic material into a form retaining consistency comprising a heat conducting element, a container for a body of liquid refrigerant and means for advancing said element alternately into heat transferring relationship with said plastic material and with said liquid refrigerant and for advancing of said material.

6. An apparatus for hardening plastic material into form retaining consistency comprising a container for a body of liquid refrigerant, a plurality of heat transferring elements mutually disposed in endless series; said elements being adapted to successively circulate through the refrigerant and then advance into heat transferring relationship with said material.

7. An apparatus for hardening plastic material into a form retaining consistency comprising a sealed refrigerant storage receptacle made of heat transferring material, means for cooling said receptacle and means for advancing said receptacle into heat transferring relationship with said plastic material.

8. An apparatus for hardening plastic material into a form retaining consistency comprising a sealed refrigerant storage receptacle made of heat transferring material, a body of liquid refrigerant, means for immersing said element into said refrigerant and means for advancing said receptacle into heat transferring relationship with said plastic material.

9. An apparatus for hardening plastic material into a form retaining consistency comprising an endless conveyor, a plurality of longitudinal rows of heat conducting elements mounted on said conveyor and adapted to advance along a substantial vertical plane, and means for feeding said plastic material along the line of travel of said elements between transversely adjoining elements.

10. An apparatus for hardening plastic material into a form retaining consistency comprising a lower endless conveyor, two spaced rows of heat conducting elements mounted on said conveyor, an upper endless conveyor, said conveyors and said elements defining a passageway and serving to advance said plastic material along said passageway and retain said material in predetermined cross-sectional form.

11. An apparatus for reducing the temperature of a substance including a conveyor having a plurality of sealed refrigerant receptacles mounted thereon and adapted to advance said receptacles in heat transferring relationship with said substance.

12. An apparatus for reducing the temperature of a substance comprising a conveyor having a plurality of spaced rows of heat conducting elements arranged lengthwise thereof, said conveyor being adapted to support said substance between adjoining conducting elements and means for chilling said elements.

13. An apparatus for reducing the temperature of a substance comprising a conveyor having a plurality of rows of heat conducting elements each row extending along the line of travel of the conveyor, said conveyor being adapted to support said substance between adjoining rows of conducting elements.

14. An apparatus for freezing ice cream into form sustaining consistency comprising a liquid refrigerant tank, a conveyor having a plurality of heat conducting elements arranged to form a U-shaped trough, and means for passing said elements alternately into said tank and into heat transferring relationship with a body of ice cream.

15. An apparatus for freezing ice cream into a form sustaining consistency comprising a liquid refrigerant tank, an endless conveyor having a plurality of refrigerant storage receptacles arranged to form a trough, said receptacles being adapted to successively dip in said tank and pass into heat transferring relationship with a body of ice cream.

16. An apparatus for reducing the temperature of a substance including a conveyor having a plurality of refrigerant receptacles provided with fins projecting from the walls of the receptacles into the refrigerant containing space.

Signed at Louisville in the county of Jefferson and State of Kentucky this 16th day of April, A. D. 1930.

CLARENCE W. VOGT.